(12) United States Patent
Nielsen (10) Patent No.: US 10,519,937 B2
(45) Date of Patent: Dec. 31, 2019

(54) ELECTRICAL CONNECTOR FOR A WIND TURBINE

(71) Applicant: VESTAS WIND SYSTEMS A/S, Aarhus N (DK)

(72) Inventor: Christian Krogh Nielsen, Aalborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 887 days.

(21) Appl. No.: 15/029,554

(22) PCT Filed: Oct. 13, 2014

(86) PCT No.: PCT/DK2014/050325
§ 371 (c)(1),
(2) Date: Apr. 14, 2016

(87) PCT Pub. No.: WO2015/055208
PCT Pub. Date: Apr. 23, 2015

(65) Prior Publication Data
US 2016/0258424 A1    Sep. 8, 2016

(30) Foreign Application Priority Data

Oct. 14, 2013  (DK) ................................ 2013 70580

(51) Int. Cl.
*F03D 9/00* (2016.01)
*F03D 80/80* (2016.01)
(Continued)

(52) U.S. Cl.
CPC .......... *F03D 80/82* (2016.05); *F03D 1/0675* (2013.01); *F03D 1/0691* (2013.01); *F03D 80/00* (2016.05);
(Continued)

(58) Field of Classification Search
None
See application file for complete search history.

(56) References Cited

U.S. PATENT DOCUMENTS 8,313,297 B2 * 11/2012 Gopfert ................... F03D 80/00
416/146 R
2010/0085007 A1  4/2010 Shu
(Continued)

FOREIGN PATENT DOCUMENTS

CN         1155144 C    6/2004
CN       101471509 A    7/2009
(Continued)

OTHER PUBLICATIONS

International Search Report for PCT/DK2014/050325, dated Apr. 17, 2015.
(Continued)

*Primary Examiner* — Kayla Mccaffrey
(74) *Attorney, Agent, or Firm* — Patterson + Sheridan, LLP (57) ABSTRACT

An electrical connector for providing power between a nacelle and a hub of a wind turbine. The electrical connector includes a first electrical connector part for connection to one of the nacelle or the hub, and a second electrical connector part for connection to the other of the nacelle or the hub. The electrical connector further includes an actuator for moving the first or second electrical connector parts in a first direction between an extended position in which the first and second connector parts are in contact and form an electrical connection between the nacelle and the hub, and a retracted position in which the first and second electrical connector parts are spaced apart and do not form an electrical connection. The first and/or second electrical connector parts include one or more magnets arranged to secure the (Continued)

first and second parts together when the respective parts are in contact.

41 Claims, 8 Drawing Sheets

(51) Int. Cl.
    *H01R 39/38*     (2006.01)
    *H01R 39/44*     (2006.01)
    *F03D 80/00*     (2016.01)
    *F03D 80/40*     (2016.01)
    *F03D 1/06*     (2006.01)
    *H01R 39/46*     (2006.01)
    *H01R 39/64*     (2006.01)

(52) U.S. Cl.
    CPC ........... *F03D 80/40* (2016.05); *H01R 39/385* (2013.01); *H01R 39/44* (2013.01); *H01R 39/46* (2013.01); *H01R 39/64* (2013.01); *F05B 2240/14* (2013.01); *Y02E 10/721* (2013.01); *Y02E 10/726* (2013.01)

(56) References Cited

U.S. PATENT DOCUMENTS

| | | | |
|---|---|---|---|
| 2010/0206990 A1* | 8/2010 | Petrenko | B64D 15/163 244/134 D |
| 2012/0162850 A1 | 6/2012 | Casazza et al. | |
| 2012/0274067 A1 | 11/2012 | Baba et al. | |
| 2012/0321473 A1 | 12/2012 | Bertolotti et al. | |
| 2013/0147201 A1 | 6/2013 | Roesner et al. | |

FOREIGN PATENT DOCUMENTS

| | | |
|---|---|---|
| CN | 101714676 A | 5/2010 |
| EP | 2369178 A1 | 9/2011 |
| WO | 2007107158 A1 | 9/2007 |

OTHER PUBLICATIONS

Danish Search Report for PA 2013 70580, dated May 28, 2014.
Chinese First Office Action for Application No. 201400668035 dated Jun. 28, 2017.

* cited by examiner

ELECTRICAL CONNECTOR FOR A WIND TURBINE

TECHNICAL FIELD

The present invention relates generally to electrical connectors for wind turbines. More specifically, the present invention relates to an electrical connector for providing an electrical connection between a nacelle and a hub of a wind turbine, and to a wind turbine including such a connector.

BACKGROUND

It is becoming increasingly common to locate electrical components inside the blades or the hub of a wind turbine. Examples of such components include de-icing systems for melting ice that accumulates on the surfaces of the blades. Known de-icing systems typically include one or more electrical heaters and one or more electrical fans located inside each blade. Aside from de-icing systems, other electrical components located inside the blades may include pitch actuators, lighting systems and sensor systems.

Wind turbines typically include a power source such as an auxiliary transformer located inside the nacelle. Electrical connectors for connecting this power source to electrical components inside the hub or blades are known, and typically comprise brush and slip ring arrangements.

However, known electrical connectors such as brush and slip ring connectors are generally not capable of supplying large amounts of power across the interface between the nacelle and hub. Therefore, in the case of de-icing systems for example, it is not possible to supply sufficient power to the hub to de-ice multiple blades simultaneously. In view of this limitation, some existing de-icing systems are configured to de-ice one blade at a time. It can take up to an hour to de-ice a single blade, so this restriction on power can lead to significant downtime of the wind turbine, which ultimately reduces the productivity of the wind turbine.

Against this background, the present invention aims to provide an improved electrical connector.

SUMMARY OF THE INVENTION

According to the present invention there is provided an electrical connector for providing power between a nacelle and a hub of a wind turbine, the electrical connector comprising: a first electrical connector part for connection to one of the nacelle or the hub; and a second electrical connector part for connection to the other of the nacelle or the hub; and an actuator for moving the first or second electrical connector parts in a first direction between an extended position in which the first and second connector parts are in contact and form an electrical connection between the nacelle and the hub, and a retracted position in which the first and second electrical connector parts are spaced apart and do not form an electrical connection; wherein the first and/or second electrical connector parts include one or more magnets arranged to secure the first and second connector parts together when the respective parts are in contact.

The magnetic connection ensures that the first and second connector parts are held firmly in contact when the parts are connected together. As will be described in further detail later, the rotor may slip slightly relative to the nacelle whilst the connector parts are connected together. The magnetic attraction between the two connector parts ensures that the parts do not slide relative to one another if the rotor slips, and hence a stable and robust electrical connection is ensured across the nacelle/hub interface. The magnets also serve to locate the parts together correctly when the parts are brought into contact.

The actuator may be configured to move the first connector part into and out of contact with the second connector part. Alternatively, the actuator may be configured to move the second connector part into and out of contact with the first connector part. The first connector part may be configured to be mounted to the hub or to the nacelle. Equally, the second connector part may be configured to be mounted to the other one of hub or the nacelle. In preferred embodiments of the invention, the first connector part is configured to be mounted to the nacelle whilst the second connector part is configured to be mounted to the hub, and the actuator is preferably arranged to move the first connector part relative to the second connector part.

The two parts of the electrical connector are preferably configured to be connected when the wind turbine rotor is parked, i.e. when the brakes are applied. The rotor is parked in a position that causes the first and second connector parts to be aligned opposite one another. When the rotor is parked, the electrical connector enables a power source located inside the wind turbine or remote from the wind turbine to be connected to the hub in order to power electrical equipment inside the hub and/or rotor blades. In preferred embodiments of the invention, the power source is an auxiliary transformer located inside the nacelle. The electrical connector is preferably configured to provide three-phase power from the source across the nacelle/hub interface.

The electrical connector is particular suitable for providing power across the nacelle/hub interface to electrical components of a de-icing system, such as fans and heaters located inside the rotor blades. The electrical connector provides a suitably robust and stable electrical connection across the nacelle/hub interface and advantageously is able to provide sufficient power to de-ice all of the blades simultaneously.

When the brakes are applied to the rotor, there may be a slight slip between the rotor and the nacelle corresponding to a single turn of the high speed shaft. This typically translates to a relative rotation between the nacelle and hub of +/−four degrees. The electrical connector is configured to accommodate this relative movement both during the process of establishing a connection between the respective connector parts, and once the connector parts are coupled together.

To this end, the second connector part preferably defines a landing zone for the first connector part. The landing zone is configured to allow the first and second connector parts to make contact over a continuous area that can accommodate the rotor slip described above. In a particular embodiment of the invention described later, the second connector part is in the form of a table having the shape of a segment of an annulus. The annular segment has an outer arc length of eight degrees to accommodate the +/−four degrees slip tolerance mentioned above. The radius of curvature of the table is substantially the distance between the table and the rotor axis.

The second connector part preferably comprises one or more conductive plates arranged to provide a substantially continuous electrical contact area between the two connector parts. Preferably there are three conductive plates for carrying three respective phases of a 3-phase electrical supply. The or each conductive plate may be suitably curved and preferably defines a substantially continuous circumferential electrical contact area between the two connector parts. The continuous contact area allows the electrical connector to accommodate the possible rotor slip described above whilst the first and second connector parts are moved into contact.

The second connector part preferably comprises one or more magnetic plates arranged to provide a substantially continuous magnetic contact area between the two connector parts. The or each magnetic plate is preferably suitably curved and defines a respective substantially continuous circumferential magnetic contact area between the two connector parts. The magnetic plates may be permanent magnets or ferrous metal plates. The first connector part preferably includes one or more permanent magnets arranged to contact one or more magnetic contact areas of the second connector part. The continuous magnetic contact area allows the electrical connector to accommodate the possible rotor slip mentioned above when the first and second connector parts are moved into contact.

The ability of the electrical connector to establish contact over a continuous contact area is a particular advantage over prior art connectors because it enables the electrical connector to accommodate possible rotor slip when the rotor is parked. In contrast, prior art connectors such as those of the plug and socket variety must be precisely aligned before an electrical connection can be established, and hence these types of connectors cannot accommodate rotor slip. Advantageously, therefore, the electrical connector of the present invention does not require such precise alignment between the nacelle and hub.

In preferred embodiments of the invention, the first electrical connector part comprises one or more electrical contact pins configured to engage the electrical contact area defined on the second connector part. Preferably there are three electrical contact pins for carrying three respective phases of a 3-phase power supply. The or each pin may be biased into engagement with the electrical contact area, for example by a suitable spring, when the first and second connector parts are in contact. This ensures that the pins are firmly in contact with the respective contacts on the second connector part and thus ensures a reliable connection and prevents arcing or welding between the pins and the conductive plates.

Advantageously, the first and or second connector part may include one or more sensors arranged to sense the relative position of the parts when the parts are in contact. In a preferred embodiment of the invention, the or each sensor is an inductive sensor and is arranged to sense the position of the magnets provided on the other connector part. If the sensor does not register the magnet on the opposing part, then this indicates that the two parts are not correctly aligned. In which case the parts may be retracted away from one another, prior to a subsequent connection attempt.

The second connector part is preferably slidably mounted to the hub or the nacelle. In a particular example of the invention to be described later, the second connector part is mounted on one or more rails that extend in a direction substantially tangential to a circular main bearing provided between the hub and the nacelle of the wind turbine to which the electrical connector is connected in use. This arrangement, in combination with some movability of the first connector part as will be described later, allows the electrical connector to accommodate rotor slip when the first and second parts are connected. This means that a stable electrical connection is maintained even if rotor slip occurs whilst the two connector parts are engaged. Preferably the electrical connector comprises biasing means for biasing the second connector part into a neutral position along the or each rail. Accordingly, if rotor slip does occur whilst the parts are connected, once the parts are disconnected the biasing means repositions the second connector part along the rail ready for a subsequent connection.

Preferably the electrical connector includes a swivel joint configured to enable the first and second connector parts to turn relative to one another about a swivel axis substantially parallel to the first direction. This swivel joint also enables the electrical connector to accommodate rotor slip when the two connector parts are connected.

In a preferred embodiment of the invention, the first electrical connector is mounted at a first end of a sliding frame configured to slide in the first direction to move the first electrical connector into and out of contact with the second electrical connector. The first electrical connector is preferably mounted to the sliding frame via the swivel joint. The first electrical connector may be moveable relative to the sliding frame in a direction substantially perpendicular to the first direction, which again enables the electrical connector to accommodate rotor slip when the two connector parts are connected.

The electrical connector may comprises a plurality of independent biasing devices between the sliding frame and the first connector part for biasing the first connector part into engagement with the second connector part. The biasing means, which may includes a set of springs, enable the first and second connector parts to align correctly relative to one another and ensure a firm contact is made between the two parts. The biasing devices also allow for a tolerance in the stroke of the actuator and in the nacelle/hub distance, as explained in more detail later with reference to particular examples of the invention.

The actuator is preferably arranged to releasably couple to the sliding frame and to drive the sliding frame in the first direction. The actuator is preferably a linear actuator and comprises a piston configured to extend and retract in the first direction. For example, the actuator may be configured to attach to the sliding frame by means of magnetic attraction. In a preferred embodiment of the invention, an electromagnet is mounted at a second end of the sliding frame and the actuator is arranged to couple to the electromagnet when the electromagnet is activated. To this end, the actuator may have a ferrous metal plate located at the end of the piston for engaging the electromagnet. The actuator is fixedly mounted to the nacelle, and in order to move the sliding frame, the actuator may extend its piston into contact with the electromagnet, and then once the actuator is coupled to the electromagnet, it may retract the piston causing the frame to slide on the rails.

The electrical connector preferably comprises a fail safe device arranged to move the first and second connector parts out of contact in the event of a loss in power. The fail safe device may be a biasing device such as a gas spring, which is moveable between a first position when the first and second connector parts are in contact and a second position when the first and second connector parts are spaced apart, and wherein the biasing device is biased towards the second position.

In order to protect the sensitive electrical components from lightning strikes, the first connector part may advantageously be enclosed within an electromagnetic compatibility box when the first and second connector parts are not in contact. Preferably the first connector part is arranged to slide out of the electromagnetic compatibility box when the connector parts are moved into contact. The electromagnetic compatibility box may comprise one or more outward opening doors biased into a closed position, for example by suitable springs, when the first connector part is inside the box. The electrical connector is preferably arranged such that in use the doors are forced open by the first connector part when the first connector part slides out of the box. The spring biased doors then automatically close once the first connector is retracted back inside the box.

The invention also provides a wind turbine comprising a nacelle; a rotor comprising one or more rotor blades extending radially outwards from a central hub, the rotor being rotatably mounted to the nacelle; and the electrical connector described above.

In preferred embodiments, the first connector part of the electrical connector is mounted to the nacelle and the second connector part of the electrical connector is mounted to the hub. The first connector part is preferably connected to a source of electrical power, for example a source of power located inside the nacelle or elsewhere, such as an auxiliary transformer. Preferably the source of power is a 3-phase supply, and the connector provides a three-phase electrical connection across the nacelle/hub interface.

The wind turbine preferably includes one or more electrical components located inside the hub and/or the blade(s). The electrical components are preferably electrically connected to the electrical connector. The electrical components may be directly connected to the second connector part, for example, or indirectly connected via other components or via a junction box. Typically the second connector part is connected to a junction box located inside the hub and the electrical components are in turn connected to the junction box.

In preferred embodiments of the invention the one or more electrical components located inside the hub and/or blade(s) are components of a de-icing system, for example heaters and fans. Hence, the electrical connector of the present invention may suitably provide power across the nacelle/hub interface to a de-icing system. However, it should be appreciated that the electrical connector is not limited to this function, and may be used to provide power to other electrical components of the rotor, such as lighting systems, sensor systems or such like.

The inventive concept encompasses the use of an electrical connector as described above for providing power across a nacelle/hub interface of a wind turbine to a rotor-based electrical system.

The invention may also be expressed in terms of a first connection part for the electrical connector described above. Further, the invention may be expressed in terms of a second connection part for the electrical connector described above.

The electrical connector of the present invention is also referred to as a power transfer unit. Accordingly, the invention also provides a wind turbine comprising: a nacelle; a rotor comprising one or more rotor blades extending radially outwards from a central hub, the rotor being rotatably mounted to the nacelle; and a power transfer unit for providing an electrical connection between the nacelle and the rotor, the power transfer unit comprising: a first electrical connector part provided on the nacelle, the first electrical connector part being electrically connected to a source of power; a second electrical connector part provided on the hub, the second electrical connector part being electrically connected to one or more electrical components located inside the hub and or rotor blade(s); and an actuator for moving the power transfer unit between an engaged position in which the first and second connector parts are in contact and form an electrical connection between the nacelle and the hub, and a disengaged position in which the first and second electrical connector parts are spaced apart and do not form an electrical connection; wherein the first and/or second electrical connector parts include one or more magnets arranged such that when the power transfer unit is in the engaged position the first and second electrical connector parts are secured in contact by means of magnetic attraction.

The optional and/or advantageous features described above in relation to any one particular expression of the invention apply equally to the invention when expressed in any of the other terms used above. Repetition of these features has been avoided purely for reasons of conciseness.

It will also be appreciated that many of the optional and advantageous features described above and throughout this specification have technical effects independent from the magnetic coupling between the first and second connector parts. Examples include the various adaptions that make the electrical connector suitable for accommodating rotor slip. Therefore, the invention may alternatively be expressed in terms of an electrical connector having any of these optional and/or advantageous features, but not necessarily including the magnetic coupling, and/or in terms of a wind turbine having such an electrical connector. In this respect, one or more divisional applications directed to these inventions are envisaged and/or one or more further applications claiming priority from the present application are also envisaged.

BRIEF DESCRIPTION OF THE DRAWINGS

The invention will now be described in more detail, by way of non-limiting example only, with reference to the accompanying figures, in which.

DETAILED DESCRIPTION

Figure 1:
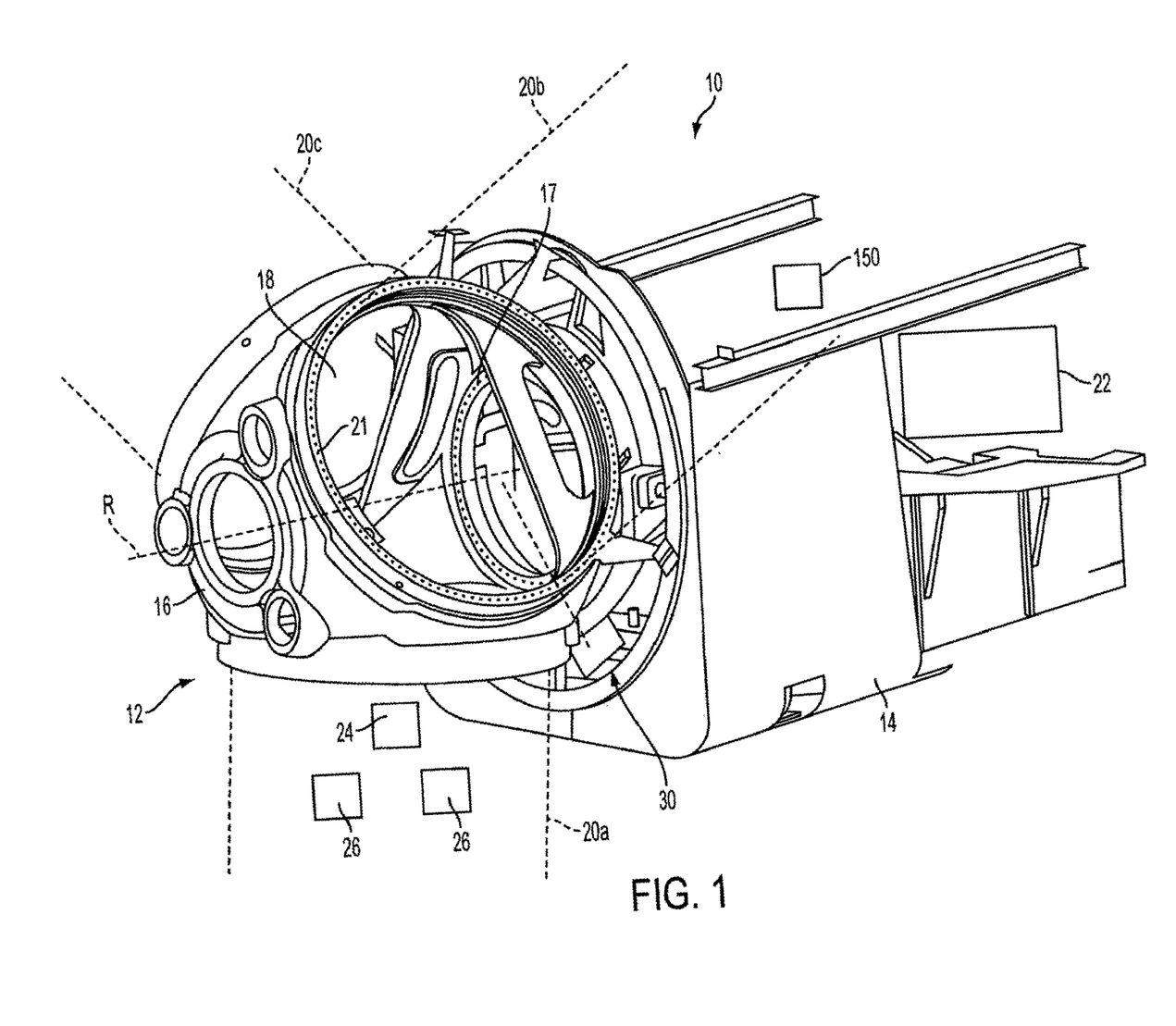
FIG. 1 shows a nacelle and rotor of a wind turbine according to an embodiment of the present invention, the wind turbine includes an electrical connector according to an embodiment of the present invention provided at an interface between the nacelle and a hub of the rotor.

FIG. 1 shows a wind turbine assembly 10 comprising a rotor 12 connected to a nacelle 14. Only a partial view of the nacelle 14 is provided in FIG. 1. The rotor 12 comprises a central hub 16, which is mounted to the nacelle 14 via a main bearing 17. The rotor 12 is configured to rotate about a rotor axis R. The hub 16 includes three circular apertures 18 equally spaced about its circumference. Three wind turbine blades 20a, 20b, 20c, represented schematically by dashed lines, are connected respectively to these apertures 18 via annular pitch bearings 21.

An auxiliary transformer 22 is located inside the nacelle 14. In other embodiments of the invention the auxiliary transformer 22 may be located elsewhere, for example at the base of the wind turbine tower or outside the tower. A heater 24 and a plurality of fans 26 of a de-icing system are located inside each blade 20a, 20b, 20c. For reasons of clarity, only the heater 24 and fans 26 associated with a first blade 20a are shown, schematically, in FIG. 1.

An electrical connector 30, referred to hereinafter as a 'power transfer unit', is mounted between the nacelle 14 and the hub 16. As will be described in further detail later, the power transfer unit 30 comprises first and second connector parts 32, 34 (see FIG. 2a) associated respectively with the nacelle 14 and the hub 16. The first connector part 32 on the nacelle side is electrically connected to the auxiliary transformer 22 inside the nacelle 14, whilst the second connector part 34 on the hub side is electrically connected to the de-icing components (e.g. fans 26 and heaters 24) inside the respective blades 20a, 20b, 20c via a junction box (not shown) located inside the hub 16.

The first and second connector parts 32, 34 of the power transfer unit 30 are configured to engage one another when the rotor 12 is in service mode, i.e. when the brakes are applied to the rotor 12 to prevent the rotor 12 from turning, and the first blade 20a is pointing downwards as shown in FIG. 1. When the first and second connector parts 32, 34 are engaged, the power transfer unit 30 provides an electrical path between the nacelle 14 and the hub 16 and serves to electrically connect the de-icing components 24, 26 in the blades 20a, 20b, 20c to the auxiliary transformer 22. The power transfer unit 30 is configured to allow sufficient power to be transferred between the auxiliary transformer 22 and the de-icing system to enable all three blades 20a, 20b, 20c to be de-iced simultaneously.

Further details of the configuration and operation of the power transfer unit 30 will now be described with reference to FIGS. 2 to 10.

Figure 2A:
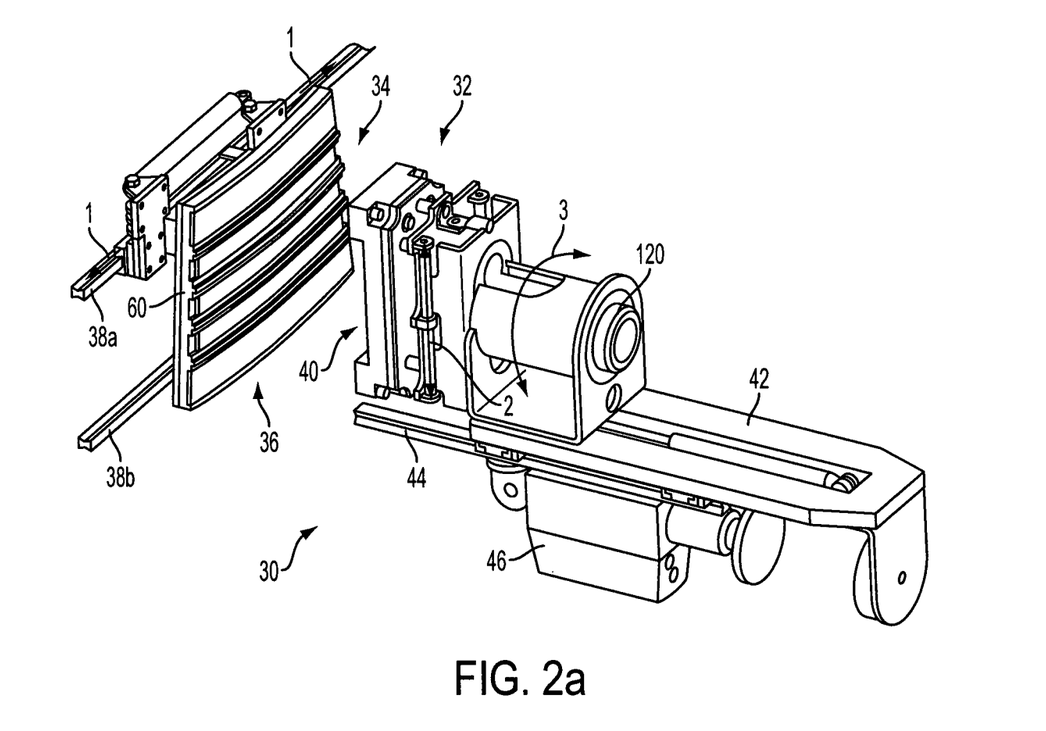
FIG. 2a shows first and second parts of the electrical connector in spaced-apart relation.
Figure 2B:
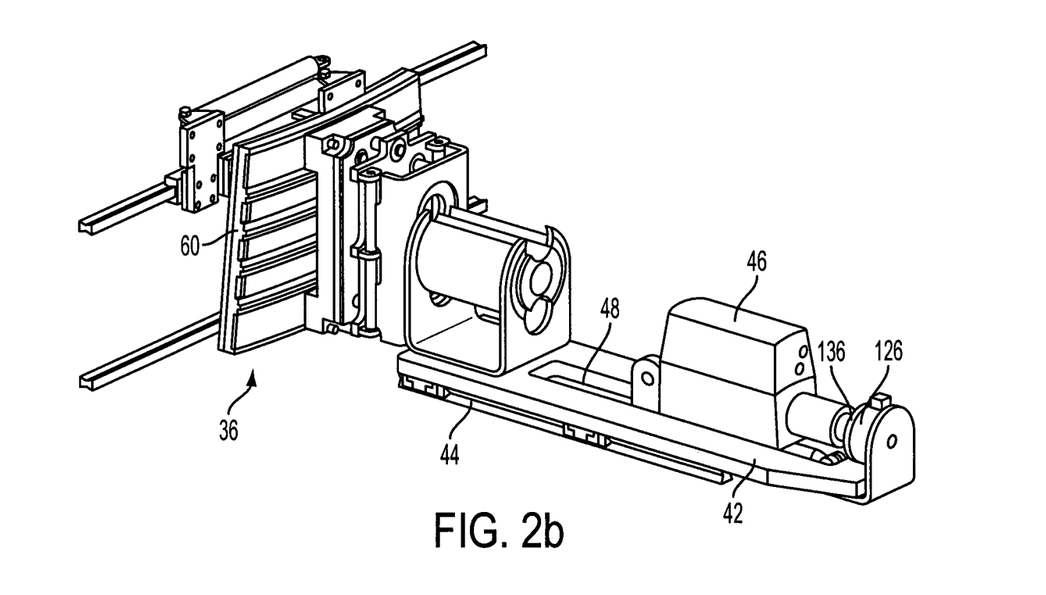
FIG. 2b shows the first and second parts of the electrical connector in contact to establish an electrical connection.

Referring to FIGS. 2a and 2b, these show the nacelle-side connector 32 and the hub-side connector 34 of the power transfer unit 30. In FIG. 2a, the power transfer unit 30 is disengaged (i.e. is in a disconnected position) in which the two connector parts 32, 34 are arranged in spaced-apart relation. When the power transfer unit 30 is disengaged, it does not supply power across the nacelle/hub interface. The power transfer unit 30 is disengaged during normal operation of the wind turbine, i.e. when the wind turbine is producing power. FIG. 2b shows the power transfer unit 30 when engaged, i.e. in a connected position in which the two connector parts 32, 34 are physically connected together. When engaged, power can be supplied via the power transfer unit 30 across the nacelle/hub interface to the de-icing components 24, 26 inside the blades 20a, 20b, 20c. The power transfer unit 30 is engaged when de-icing of the blades is required and when the brakes are applied to the rotor 12.

The hub-side connector 34 comprises a table 36, which is slidably mounted on a pair of parallel rails 38a, 38b, which are fixed to the hub 16 (FIG. 1). The table is configured to slide on the rails 38a, 38b in the direction of the arrow indicated by reference numeral '1' in FIG. 2a. The table 36 will be described in further detail later with reference to FIGS. 3 to 5.

The nacelle-side connector 32 comprises a plug 40, which will also be described in further detail later with reference to FIGS. 6 and 7. The plug 40 is mounted to a frame 42, which is slidably mounted on a pair of parallel rails 44, which are fixed to the nacelle 14. The rails 44 extend substantially perpendicular to the plane of the table 36. A linear actuator 46 is also fixed to the nacelle 14. As will be described in further detail later with reference to FIGS. 8a and 8b, the linear actuator 46 serves to move the sliding frame 42 along the parallel rails 44 such that the plug 40 is moved in a first direction towards or away from the table 36.

It will be appreciated that FIGS. 2a and 2b constitute slight variants of the invention: in FIG. 2a the linear actuator 46 is mounted below the sliding frame 42, whilst in FIG. 2b the linear actuator 46 extends through a slot 48 in the sliding frame 42.

As will become apparent from the subsequent description, the table 36 defines a 'landing zone' for the plug 40 when the plug 40 is moved into contact with the table 36, i.e. when the power transfer unit 30 is moved from the disconnected position shown in FIG. 2a to the connection position shown in FIG. 2b.

The table 36 will now be described in further detail with reference to FIGS. 3 to 5.

Figure 3:
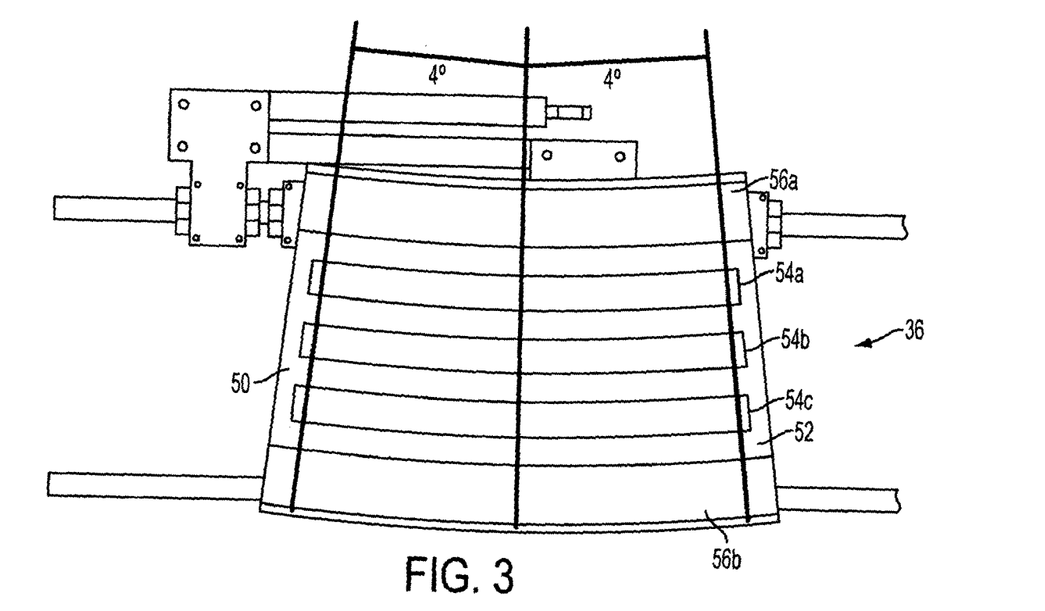
FIG. 3 is a front view of the second connector part.

Referring now to the front view of FIG. 3, the table 36 is generally flat and has a front surface 50 having the shape of a section of an annulus. This shape is designed to provide a suitable landing zone for the plug 40 that can accommodate a slight slip between the hub 16 and the nacelle 14 when the brakes are applied to the rotor 12. When the brakes are applied, the rotor 12 may slip by an amount corresponding to one revolution of the high speed shaft, which equates to a slip of the hub 16 of the order of +/−four degrees. Accordingly, as shown in FIG. 3, the table 36 comprises an eight degree annular segment. The radius of curvature of the table 36 corresponds approximately to the perpendicular distance 'd' between the power transfer unit 30 and the rotor axis R (as shown in FIG. 1). The curvature of the table 36 is generally concentric with the curvature of the circular main bearing 17 between nacelle 14 and the hub 16.

Referring still to FIG. 3, the table 36 comprises a non-conductive base plate 52. Three conductive plates 54a, 54b, 54c are mounted to the front surface 50 of the base plate 52. The front surface 50 of the base plate 52 faces the plug 40 when the plug 40 and table 36 are aligned. The conductive plates 54a, 54b, 54c are metallic strips, which each have a slight curvature corresponding to the curvature of the table 36. The strips 54a, 54b, 54c extend parallel to one another in a circumferential direction, i.e. in the direction of curvature of the table 36. The strips 54a, 54b, 54c are mutually spaced apart in a radial direction in order to prevent short circuits from occurring between the strips 54a, 54b, 54c.

A pair of magnetic plates 56a, 56b is also mounted to the front surface 50 of the base plate 52. The magnetic plates 56a, 56b are made from galvanised magnetic steel alloy, which is substantially corrosion resistant and can therefore withstand the environmental conditions of the wind turbine. The magnetic plates 56a, 56b are also in the form of strips, and again the strips have a slight curvature corresponding to the curvature of the table 36. A first magnetic strip 56a is mounted generally above the set of conductive plates 54a, 54b, 54c and a second magnetic strip 56b is mounted generally below the set of conductive plates 54a, 54b, 54c. The magnetic strips 56a, 56b extend circumferentially and generally parallel to the conductive plates 54a, 54b, 54c. The relative terms 'above' and 'below' are not intended to limit the scope of the invention and are used for convenience to refer to the orientation of the various plates as shown in the drawings. Expressed in other terms, the set of conductive plates 54a, 54b, 54c are arranged between the first and second magnetic plates 56a, 56b.

The magnetic plates 56a, 56b are spaced apart from the conductive plates 54a, 54b, 54c in order to prevent short circuits from occurring between the plates. As best seen in FIGS. 2a and 2b, the various plates are mounted in respective recesses 60 in the front surface 50 of the base plate 52. These recesses 60 serve to prevent water, ice and snow from creating short circuits between the plates.

Figure 4:
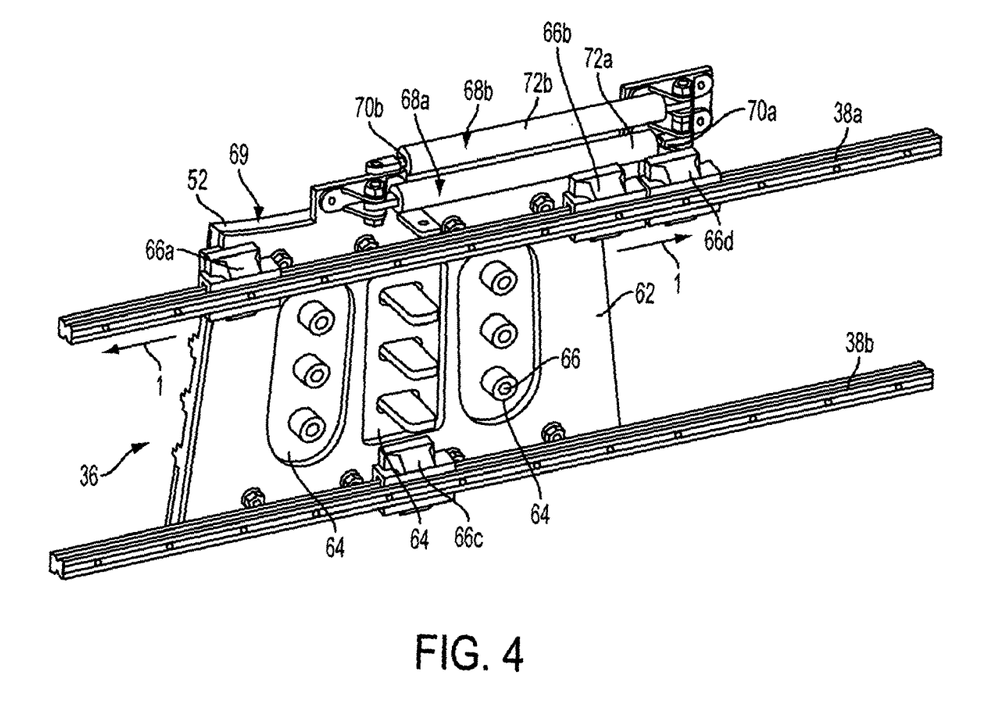
FIG. 4 is a perspective rear view of the second connector part.
Figure 5A:
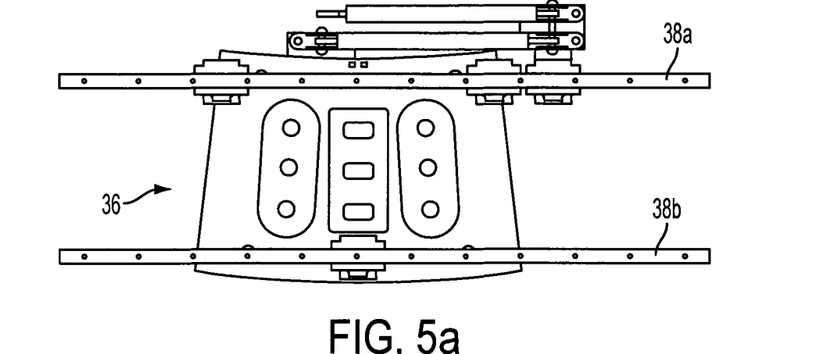
FIGS. 5a, 5b, and 5c are rear views of the second connector part illustrating sliding movement of the second connector part along a set of parallel rails.

Referring now to the rear view of FIG. 4, the table 36 further comprises a rear plate 62 mounted to a rear surface of the base plate 52. The rear plate 62 serves to stiffen the table 36 in order to prevent the table 36 from deforming when the plug 40 is moved into contact with the table 36. In order to prevent short circuits, the rear plate 62 includes cut-out portions 64 surrounding the bolts and fasteners 66 that secure the conductive plates 54a, 54b, 54c to the base plate 52.

A set of guides 66a, 66b, 66c are mounted to the rear plate 62. First and second guides 66a, 66b are mounted respectively in the upper corners of the rear plate 62 and a third guide 66c is mounted substantially centrally along a lower edge of the rear plate 62. The first and second guides 66a, 66b slidably engage the upper rail 38a and the third guide 66c slidably engages the lower rail 38b of the parallel rails mentioned above with reference to FIGS. 2a and 2b. The guides 66a, 66b and 66c each include ball bearings that facilitate sliding of the table 36 along the rails 38a, 38b.

The sliding arrangement between the table 36 and the guide rails 38a, 38b allows the table 36 to move slightly when the plug 40 is connected to accommodate any slight slip in the rotor 21. As mentioned above, the rotor 12 may slip by an amount corresponding to one revolution of the high speed shaft, which equates to a slip of the hub 16 of the order of +/−four degrees. It will be appreciated from the figures that the parallel rails 38a and 38b extend substantially tangentially to the curvature of the table 36 and hence are also substantially tangential to the curvature of the main bearing 17 in view of the concentricity between the respective curvatures of the main bearing 17 and table 36. Accordingly, the table 36 is configured to slide on the rails 38a and 38b in a tangential direction.

Referring still to FIG. 4, first and second gas springs 68a, 68b are coupled to the table 36, and these serve to re-centre the table 36 along the rails 38a, 38b after the plug 40 is disengaged from the table 36, if any slip has occurred in the rotor 12. The gas springs 68a, 68b are arranged substantially parallel to the rails 38a, 38b and adjacent an upper edge 69 of the table 36. Each gas spring 68a, 68b comprises a piston 70a, 70b that is slidable within a respective cylinder 72a, 72b. The cylinder 72a of the first gas spring 68a is mounted to the upper edge 69 of the rear plate 62 of the table 36, whilst the piston 70a of the first gas spring 68a is mounted to a fourth guide 66d arranged to slide along the upper rail 38a, outboard from and adjacent to the second guide 66b. The cylinder 72b of the second gas spring 68b is also mounted to the fourth guide 66d, whilst the piston 70b of the second gas spring 68b is mounted to the hub 16.

The mode of operation of the gas springs 68a, 68b for re-positioning the table 36 along the slide rails 38a, 38b following disconnection of the plug 40, and before a subsequent reconnection, will now be described briefly with reference to FIGS. 5a-c. Referring to FIG. 5a, this shows the table 36 in a neutral position on the slide rails 38a, 38b. In this position, the table 36 is ready to receive the plug 40.

Figure 5B:
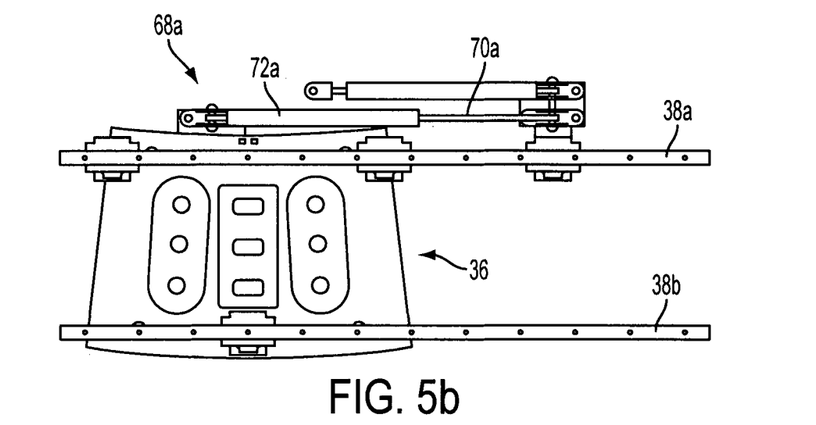
Figure 5C:
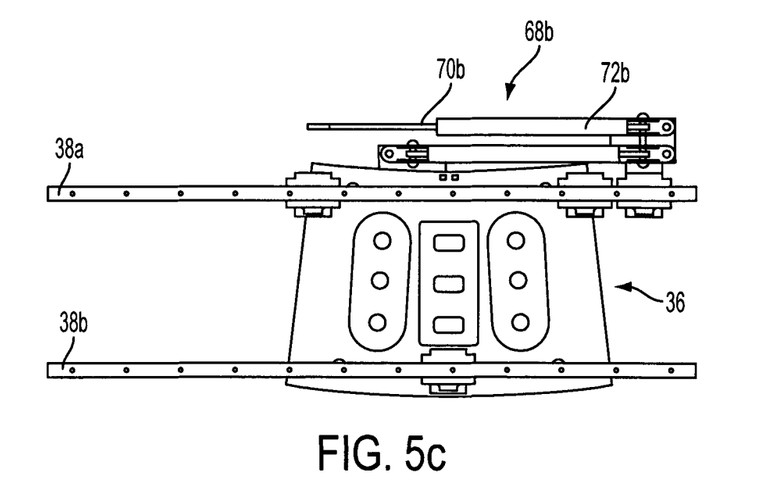

Referring to FIG. 5b, this shows the table 36 moved in one direction along the slide rails 38a, 38b, for example to accommodate a rotor slip of +4 degrees when the plug 40 and table 36 are connected. Here it can be seen that this translation of the table 36 along the guide rails 38a, 38b causes the piston 70a of the first gas spring 68a to extend. Once the plug 40 is disconnected from the table 36, the piston 70a will withdraw back into its respective cylinder 72a and pull the table 36 back to the neutral position shown in FIG. 5a. Referring now to FIG. 5c, this shows the table 36 moved in the opposite direction along the slide rails 38a, 38b, for example to accommodate a rotor slip of −4 degrees when the plug 40 and table 36 are connected. Here it can be seen that this translation of the table 36 along the guide rails 38a, 38b causes the piston 70b of the second gas spring 68b to extend. Once the plug 40 is disconnected from the table 36, the piston 70b will withdraw back into its respective cylinder 72b and pull the table 36 back to the neutral position shown in FIG. 5a.

The plug 40 will now be described in more detail with reference to FIGS. 6 and 7.

Figure 6:
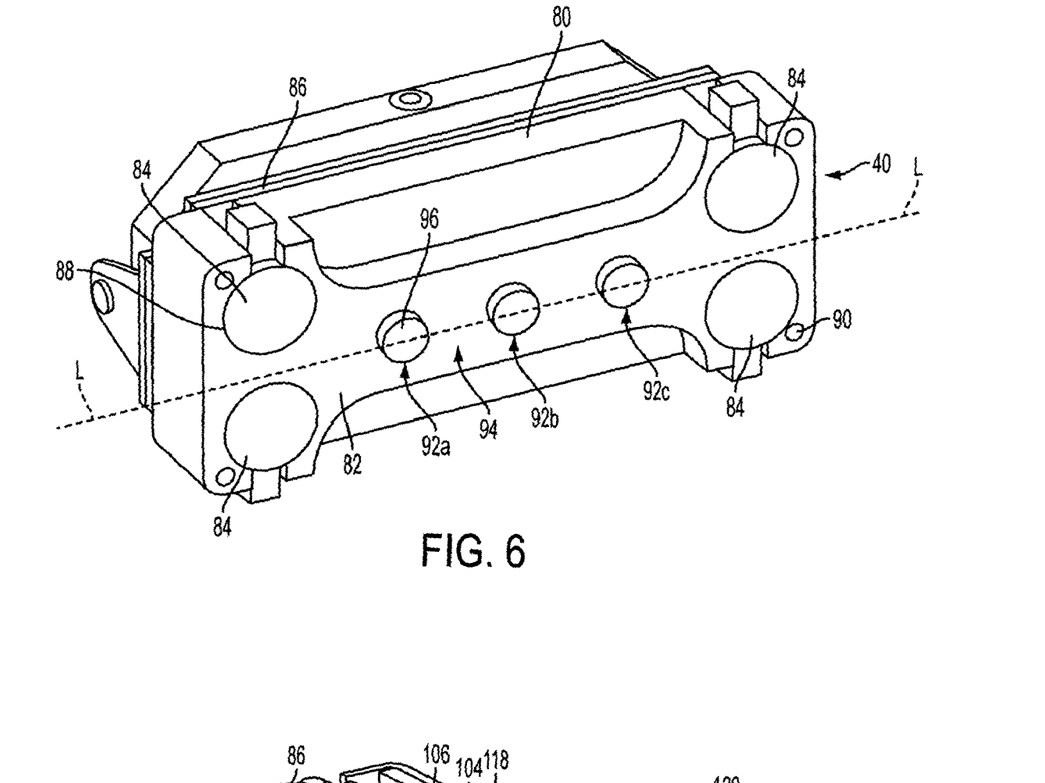
FIG. 6 is a perspective view of a plug portion of the first connector part.

Referring to FIG. 6, the plug 40 has the shape of an elongate rectangle and comprises an external housing 80 made from non-conductive material. The external housing 80 forms a front face 82 of the plug 40, which makes contact with the hub-side table connector 36 when the power transfer unit 30 is in the connected position. The plug 40 includes four cylindrical permanent magnets 84 made from neodymium. The magnets 84 are arranged respectively at the four corners of the plug 40. The magnets 84 are each mounted to a base plate 86 of the plug 40 (FIG. 7), and the housing 80 of the plug 40 includes four apertures 88 in the respective corners of the plug 40, which expose the respective magnets 84 in the front face 82 of the plug 40. When the power transfer unit 30 is moved into the connected position, the magnets 84 of the plug 40 make contact with the magnetic plates 54a, 54b, 54c of the table 36 (described above with reference to FIG. 3) and serve to maintain a fixed electrical connection between the plug 40 and the table 36 during the de-icing process.

An inductive sensor 90 is provided in each corner of the plug 40. The sensors 90 ensure that the plug 40 is positioned correctly with respect to the table 36 before power transfer through the unit 30 is enabled.

Referring still to FIG. 6, the plug 40 further comprises a set of three conductive pins 92a, 92b, 92c, arranged in a line in a substantially central region 94 of the plug 40. The pins 92a, 92b, 92c are spaced apart from one another in a longitudinal direction, parallel to a longitudinal axis 'L' of the plug 40. When the plug 40 is arranged opposite the table 36, the longitudinal direction corresponds generally to the radial direction referred to above. Each pin 92a, 92b, 92c has a respective contact end 96, which extends through a respective aperture provided in the front surface 82 of the plug housing 80. The exposed contact ends 96 of the pins 92a, 92b, 92c make contact with the respective conductive plates 54a, 54b, 54c on the front surface 50 of the table 36 when the plug 40 and table 36 are moved into contact. Each pin 92a, 92b, 92c carries a respective phase of the three-phase output provided by the auxiliary transformer 22.

Figure 7:
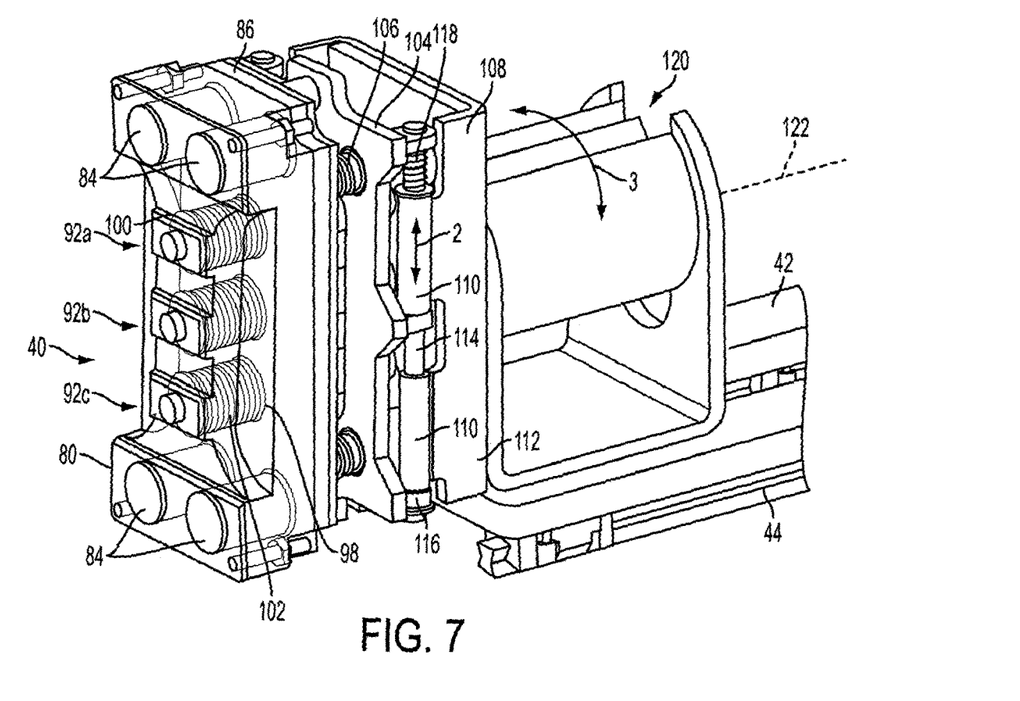
FIG. 7 is a further perspective view of the plug in which an external housing of the plug has been made transparent to reveal the components inside the plug.

FIG. 7 shows the plug 40 mounted to the sliding frame 42 and with the external housing 80 of the plug 40 shown as transparent to reveal the pins 92a, 92b, 92c and magnets 84 inside the housing 80. Referring to FIG. 7, each pin 92a, 92b, 92c extends through a respective aperture 98 provided in the base plate 86 of the plug 40. Each pin 92a, 92b, 92c includes a circular collar 100 located adjacent the contact end 96 of pin 92a, 92b, 92c. The circular collar 100 is located inside the plug housing 80, directly behind the respective aperture through which the contact end 96 of the pin 92a, 92b, 92c projects. Each pin 92a, 92b, 92c further includes a respective spring 102 located between the base plate 86 of the plug 40 and the collar 100 of the pin 92a, 92b, 92c. The springs 102 serve to bias the pins 92a, 92b, 92c into engagement with the respective conductive plates 54a, 54b, 54c of the table 36 when the power transfer unit 30 is in the connected position. Each spring 102 provides a pressure of 7 kg per pin 92a, 92b, 92c. The springs 102 also ensure that the entire contact surfaces 96 of the respective pins 92a, 92b, 92c are in contact with a respective conductive plate 54a, 54b, 54c, which prevents welding and arcing when the contact is made between the plug 40 and table 36.

Referring still to FIG. 7, the plug 40 is mounted to the sliding frame 42 by a bracket 104. A set of four springs 106 is provided between the bracket 104 and a rear surface of the plug 40. These springs 106 are independent from one another and serve to ensure that the plug 40 and the table 36 are firmly in contact and correctly aligned. These springs 106 further serve to provide a tolerance of +/−5 mm in the distance between the nacelle 14 and the hub 16.

The bracket 104 in turn is mounted to the sliding frame 42 by means of a generally rectangular adapter plate 108. The adapter plate 108 includes a pair of elongate sleeves 110 that are axially spaced apart on a first longitudinal side 112 of the adapter plate 108. A rod 114 extends through the sleeves 110. Whilst not visible in FIG. 7, an identical pair of sleeves and a corresponding rod is provided on the other longitudinal side of the adapter plate 108. The bracket 104 comprises a plurality of clasps 116 on a rear surface of the bracket 104. These clasps 116 firmly connect to the respective rods 114. The rods 114 are slidable within the sleeves 110 to allow the plug 40 to move slightly relative to the sliding frame 42 in the longitudinal direction, as indicated by the arrows '2' in FIG. 7. At one end of each rod 114, a respective spring 118 is provided around the rod 114. The springs 118 each extend between a respective sleeve 110 and a respective clasp 116 of the bracket 104. The springs 118 serves to bias the plug 40 into a neutral position in the longitudinal direction 2 relative to the sliding frame 42.

The adapter plate 108 in turn is coupled to the sliding frame 42 by means of a swivel joint 120. The swivel joint 120 allows the plug 40 to turn relative to the sliding frame 42 (as shown by the arrow '3' in FIG. 7) about a swivel axis 122 substantially parallel to the slide rails 44, i.e. substantially perpendicular to the plane of the table 36. This rotational degree of freedom 3 provided by the swivel joint 120 in combination with the longitudinal degree of freedom 2 described above, enables the power transfer unit 30 to accommodate a slight slip in the hub 16 when the unit 30 is engaged, as will be described in more detail later.

Figure 8A:
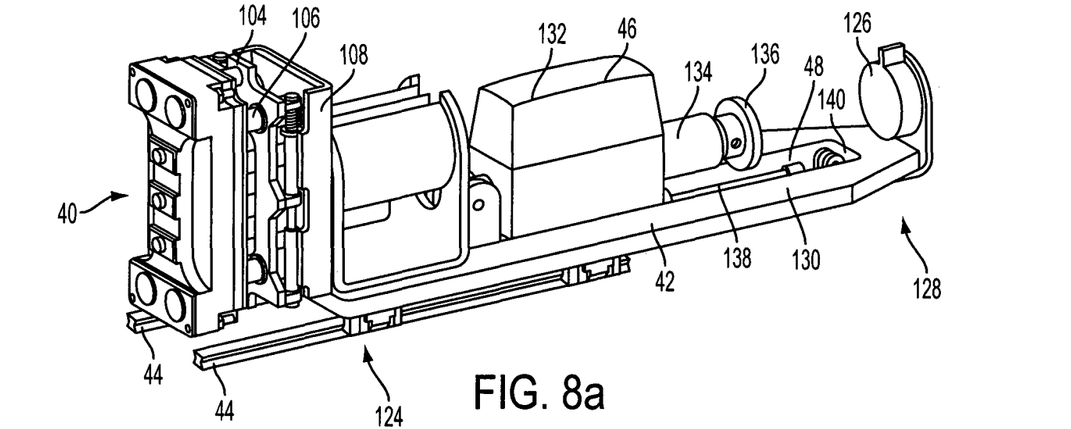
FIG. 8a shows the first connector part in a retracted position.
Figure 8B:
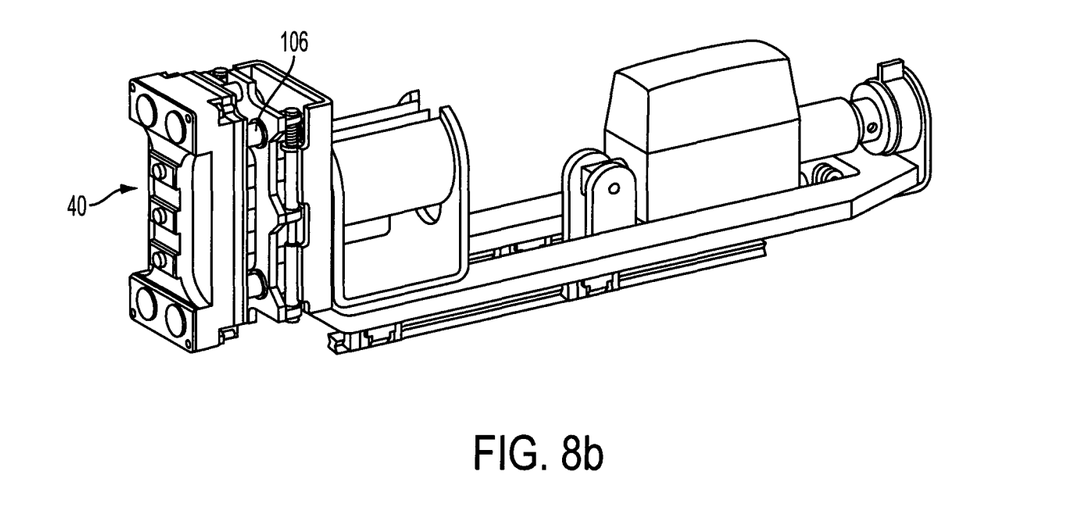
FIG. 8b shows the first connector part in an extended position.

Referring now to FIGS. 8a and 8b, these show the plug 40 mounted to the sliding frame 42. FIG. 8a shows the plug 40 in a retracted position, i.e. when the power transfer unit 30 is disconnected, and FIG. 8b shows the plug 40 in an extended position, i.e. when the plug 40 is moved into contact with the table 36. Referring to FIG. 8a, the plug 40, bracket 104 and adapter plate 108 are mounted at a first end 124 of the sliding frame 42 and an electromagnet 126 is mounted at a second end 128 of the sliding frame 42. As mentioned earlier with reference to FIGS. 2a and 2b, a linear actuator 46 is provided for moving the plug 40 into engagement with the table 36. The linear actuator 46 is mounted to the nacelle 14 and extends through the slot 48 provided in a base 130 of the sliding frame 42. The slot 48 is provided in a central region of the base 130 and extends substantially parallel to the slide rails 44.

The linear actuator 46 is electrically operated and comprises a housing 132 and a piston 134. The piston 134 is arranged to extend and retract relative to the housing 132. A plate 136 made from ferrous metal is mounted to an end of the piston 134. The piston 134 extends relative to the housing 132 to move the plate 136 into contact with the electromagnet 126. Once the plate 136 is in contact with the electromagnet 126, the electromagnet 126 is turned on to magnetically couple the plate 136 to the electromagnet 126. The piston 134 is then retracted back into the housing 132 of the linear actuator 46, which causes the electromagnet 126 to move towards the housing 132 of the linear actuator 46 and hence causes the sliding frame 42 to move along the rails 44 and move the plug 40 into contact with the table 36 (as shown in FIG. 2b). The stroke of the piston 134 exceeds the distance from the plug 40 to the table 36. The excess stroke is accommodated by the springs 106 between the plug 40 and the bracket 104, which were described above with reference to FIG. 7. These springs 106 therefore allow for a tolerance on the stroke of the actuator 46.

A gas spring 138 is provided in the slot 48 in the base 130 of the sliding frame 42. The gas spring 138 extends between the linear actuator 46 and an end wall 140 of the slot 48, adjacent the electromagnet 126. The gas spring 138 is compressed when the electromagnet end 128 of the sliding frame 42 moves towards the linear actuator 46, i.e. when the plug 40 moves into contact with the table 36, as shown in FIG. 8b and FIG. 2b. The gas spring 138 is biased towards its extended position (as shown in FIG. 8a), and serves as a safety device: in the event of a loss of power, the electromagnet 126 will be deactivated causing a loss of magnetic attraction to the ferrous plate 136 of the linear actuator 46 and the gas spring 138 will then extend causing the sliding frame 42 to move back along the rails 44 and hence causing the plug 40 to move out of contact with the table 36, thereby breaking the electrical connection between the nacelle 14 and the hub 16.

Figure 9:
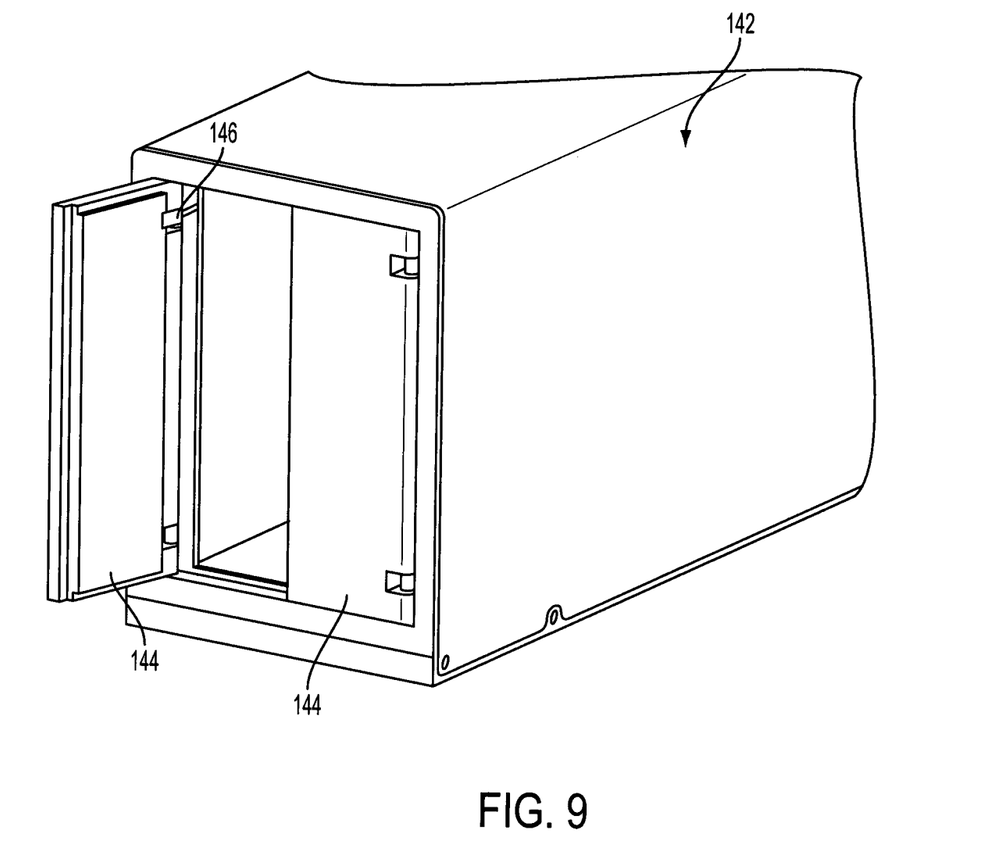
FIG. 9 shows an electromagnetic compatibility box for housing the plug.

Referring to FIG. 9, the entire plug 40 is mounted inside an electromagnetic compatibility (EMC) box 142 to safeguard the plug 40 against lighting strikes. The box 142 is made from stainless steel that is 4mm thick. The box 142 is normally fully closed to safeguard the components when the power transfer unit 30 is disconnected. A set of doors 144 is provided at the front of the box 142, i.e. opposite the table 36 when the plug 40 and the table 36 are aligned. The doors 144 open outwards and are biased into the closed position by torsional springs 146. The box 142 is mounted to the nacelle 14 and is fixed relative to the sliding frame 42. Accordingly, when the linear actuator 46 extends, it pushes the plug 40 against the doors 144 causing the doors 144 to open. When the linear actuator 46 retracts, the plug 40 moves back inside the box 142 and the doors 144 close by virtue of the springs 146.

It has already been described above that the power transfer unit 30 should be able to accommodate a rotor slip of +/−4 degrees both before the plug 40 and the table 36 are connected, and also once the plug 40 and the table 36 are connected. The size and arcuate shape of the table 36 are designed to accommodate this amount of slip before the plug 40 and the table 36 are connected. In this respect, and as mentioned above, the table 36 provides a landing zone for the plug 40 that enables the plug 40 to be connected to the table 36 over this slip range. This is a significant advantage over prior art electrical connectors of the plug and socket variety which do not provide an equivalent tolerance for slip and must be perfectly aligned to create a connection.

Once the plug 40 and the table 36 are connected, and the electrical supply is provided to the de-icing system, the power transfer unit 30 of the present invention is further able to accommodate a rotor slip of +/−4 degrees whilst maintaining a fixed electrical connection between the plug 40 and the table 36. This is achieved through a combination of the sliding mounting arrangement of the table 36, as described above with reference to FIG. 4 and FIGS. 5a to 5c, and the moveable coupling between the plug 40 and the sliding frame 42, which was described above with reference to FIG. 7. Referring again briefly to FIG. 4, the degree of freedom provided by the sliding mounting arrangement of the table 36 is indicated by the arrows with reference numeral '1' in FIG. 4. Referring now briefly to FIG. 7, the degree of freedom in the longitudinal direction of the plug 40 is indicated by the arrows with reference numeral '2', whilst the degree of freedom provided by the swivel joint 120 is indicated by the reference numeral '3' in FIG. 7. These three degrees of freedom combine as shown in FIG. 10 to accommodate a slip between the rotor 12 and the nacelle 14 when the plug 40 and the table 36 are connected.

Figure 10:
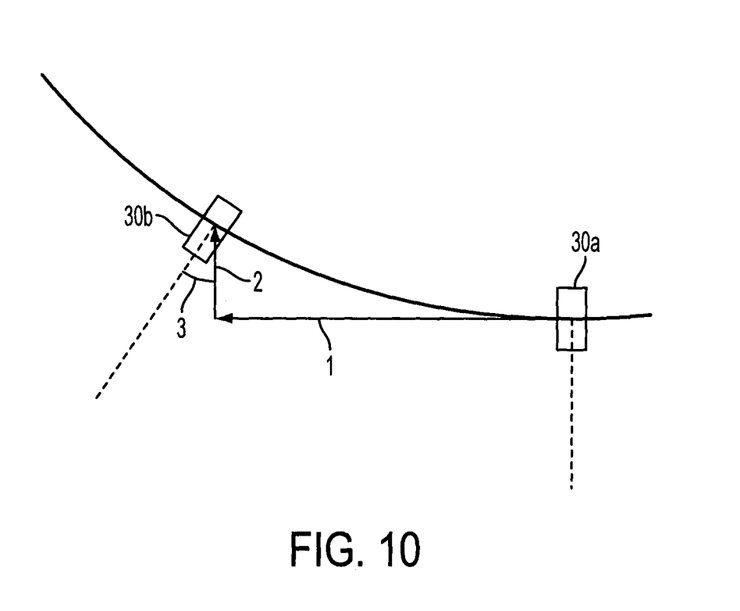
FIG. 10 illustrates how the electrical connector is able to accommodate rotor slip when the first and second connector parts are connected together.

Referring to FIG. 10, the power transfer unit 30 is represented by the two rectangles 30a and 30b. The first rectangle 30a indicates the position of the power transfer unit 30 when the plug 40 and table 36 are initially connected, and the second rectangle 30b indicates the position of the power transfer unit 30 following a slight rotation of the hub 16, caused by rotor slip, whilst the plug 40 and table 36 remain connected. To accommodate the slight rotation of the hub 16, the table 36 moves along its rails 38a, 38b in the direction of arrow 1, whilst the plug 40 moves longitudinally relative to the adapter plate 108 in the direction of arrow 2. Further, the plug 40 swivels slightly about the swivel axis 122 shown in FIG. 7. The four magnets 84 provided at the respective corners of the plug 40 advantageously prevent the plug 40 from tilting when the rotor turns, and more generally serve to maintain the plug 40 and table 36 firmly in contact despite any rotor slip.

A method of de-icing the blades of the wind turbine involving engaging the power transfer unit 30 will now be outlined, with reference again to the figures already described above. The method is automated by a programmed controller 150, which is represented schematically in FIG. 1.

Referring to FIG. 1, the hub 16 is stopped with the first blade 20a pointing vertically downwards and the brakes are applied. This ensures that the table 36 mounted to the hub 16 is positioned opposite the plug 40 within a tolerance of ±4 degrees.

Next, and referring to FIG. 2b, the linear actuator 46 extends to create contact with the electromagnet 126. The electromagnet 126 is then turned on so that it magnetically attaches to the ferrous metal plate 136 of the actuator 46. The actuator 46 retracts again, and with the electromagnet 126 still coupled to the ferrous plate 136, the sliding frame 42 is caused to slide along the rails 44, which in turn drives the plug 40 towards the table 36.

Referring now also to FIGS. 6 and 7, as the plug 40 moves towards the table 36, contact with the table 36 is first made by the three conductive pins 92a, 92b, 92c in the plug 40. The springs 102 surrounding the pins 92a, 92b, 92c obtain a small amount of stroke (corresponding to 7 kg per pin) and align the pins 92a, 92b, 92c to obtain optimal electrical connection before the permanent magnets 84 reach the table 36.

The permanent magnets 84 are fixed in the plug 40, and as the linear actuator 46 retracts, the four independent springs 106 between the plug 40 and the rear bracket 104 compress until full stoke is reached by the actuator 46. The springs 106 align the entire plug 40 with the table 36 and ensure contact between the plug 40 and the table 36 by accommodating a tolerance of ±5 mm on the hub-nacelle distance.

The four inductive sensors 90 on the front face 82 of the plug 40 confirm the correct position of the plug 40 by sensing the position of the magnetic plates 56a, 56b of the table 36. If one or more of the sensors 90 fail to sense the magnetic plates 56a, 56b of the table 36, the actuator 46 will retract the plug 36 again.

After successful landing of the plug 40, power transfer to the de-icing equipment commences.

During the power transfer, the hub 16 might slip ±4 degrees corresponding to a slip in the brake of one revolution of the high speed shaft, as mentioned previously. The rotation of the hub 16 will be accommodated in the two linear joints and the rotational joint described above with reference to FIG. 10. The position of the hub 16 is monitored by suitable sensors and its position is fed to the controller 150. If the position of the hub 16 indicates that the outer slip tolerance has been reached or exceeded, then the controller 150 is configured to cut off the power transfer and to retract the plug 40.

Should the cut off fail for any reason and the hub 16 continue to rotate with the plug 40 and table 36 connected, the plug 40 will slide across the table 36 until one or more of the inductive sensors 90 fail to confirm a correct position. The power will then be cut off before arcing happens, and the plug 40 will be retracted.

All three blades 20a, 20b, 20c are de-iced simultaneously. This is a particular benefit of the present invention and is made possible by the power transfer unit 30, which is capable of providing sufficient power across the nacelle/hub interface to de-ice all of the blades at the same time.

Once the de-icing process is complete, the plug 40 is retracted, and the electromagnet 126 is shut off to conserve power until a subsequent de-icing process is required.

It should be appreciated that the various tolerances referred to in the preceding description are provided by way of example and are not intended to limit the scope of the invention. For example, whilst a slip tolerance of +/−4 degrees is mentioned specifically, it will be appreciated that other tolerances may be achieved through suitable selection of the various dimensions of the components. In particular, increasing the width of the table 36 and/or the length of the guide rails 38a, 38b on which the table 36 slides will increase the slip tolerance.

Whilst the power transfer unit 30 has been described in the context of a de-icing system, it will be apparent that the power transfer unit 30 is suitable for supplying power across the nacelle/hub interface to other electrical components, such as lighting, or sensor systems for example.

Many other modifications may be made to the examples described above without departing from the scope of the present invention as defined by the accompanying claims.

What is claimed is:

1. An electrical connector for providing power between a nacelle and a hub of a wind turbine, the electrical connector comprising:
   a first electrical connector part for connection to one of the nacelle or the hub;
   a second electrical connector part for connection to the other of the nacelle or the hub; and an actuator for moving the first or second electrical connector parts in a first direction between an extended position in which the first and second connector parts are in contact and form an electrical connection between the nacelle and the hub, and a retracted position in which the first and second electrical connector parts are spaced apart and do not form an electrical connection;

wherein at least one of the first and second electrical connector parts comprise one or more magnets arranged to secure the first and second connector parts together when the respective parts are in contact.

2. The electrical connector of claim 1, wherein the actuator is configured to move the first connector part into and out of contact with the second connector part.

3. The electrical connector of claim 1, wherein the second connector part defines a landing zone for the first connector part.

4. The electrical connector of claim 1, wherein the second connector part is in the form of a table having the shape of a segment of an annulus.

5. The electrical connector of claim 1, wherein the second connector part comprises one or more conductive plates arranged to provide a substantially continuous electrical contact area between the first and second connector parts.

6. The electrical connector of claim 5, wherein the one or more conductive plates comprises three conductive plates for carrying three respective phases of a 3-phase electrical supply.

7. The electrical connector of claim 5, wherein the one or more conductive plates are curved and define a substantially continuous circumferential electrical contact area between the first and second connector parts.

8. The electrical connector of claim 1, wherein the second connector part comprises one or more magnetic plates arranged to provide a substantially continuous magnetic contact area between the first and second connector parts.

9. The electrical connector of claim 8, wherein the one or more each magnetic plates are curved and define a respective substantially continuous circumferential magnetic contact area between the first and second connector parts.

10. The electrical connector of claim 1, wherein the first connector part includes one or more permanent magnets arranged to contact one or more magnetic contact areas of the second connector part.

11. The electrical connector of claim 1, wherein the first electrical connector part comprises one or more electrical contact pins configured to engage an electrical contact area defined on the second connector part.

12. The electrical connector of claim 11, wherein the one or more electrical contact pins comprises three electrical contact pins for carrying three respective phases of a 3-phase electrical supply.

13. The electrical connector of claim 11, wherein the one or more contact pins are biased into engagement with the electrical contact area when the first and second connector parts are in contact.

14. The electrical connector of claim 13, wherein the one or more contact pins are biased into engagement with the electrical contact area by means of a respective spring associated with the pin.

15. The electrical connector of claim 1 wherein at least one of the first and second connector parts include at least one sensor arranged to sense a relative position of the parts when the parts are in contact.

16. The electrical connector of claim 15, wherein the at least one sensor is an inductive sensor and is arranged to sense the position of at least one of the one or more magnets provided on another of the connector parts.

17. The electrical connector of claim 1, wherein the second connector part is slidably mounted to the hub or the nacelle.

18. The electrical connector of claim 17, wherein the second connector part is mounted on one or more rails that extend in a direction substantially tangential to a circular main bearing provided between the hub and the nacelle of the wind turbine to which the electrical connector is connected in use.

19. The electrical connector of claim 18, further comprising a biasing means for biasing the second connector part into a neutral position along the one or more rails.

20. The electrical connector of claim 1, further comprising a swivel joint configured to enable the first and second connector parts to turn relative to one another about a swivel axis substantially parallel to the first direction.

21. The electrical connector of claim 1, wherein the first electrical connector part is mounted at a first end of a sliding frame configured to slide in the first direction to move the first electrical connector part into and out of contact with the second electrical connector part.

22. The electrical connector of claim 21, wherein the first electrical connector part is mounted to the sliding frame via a swivel joint.

23. The electrical connector of claim 21, wherein the first electrical connector part is moveable relative to the sliding frame in a direction substantially perpendicular to the first direction.

24. The electrical connector of claim 21, wherein the electrical connector further comprises a plurality of independent biasing devices between the sliding frame and the first connector part for biasing the first connector part into engagement with the second connector part.

25. The electrical connector of claim 21, wherein the actuator is arranged to releasably couple to the sliding frame and to drive the sliding frame in the first direction.

26. The electrical connector of claim 25, wherein the actuator is arranged to couple to the sliding frame by means of magnetic attraction.

27. The electrical connector of claim 26, wherein an electromagnet is mounted at a second end of the sliding frame and the actuator is arranged to couple to the electromagnet when the electromagnet is activated.

28. The electrical connector of claim 1, further comprising a fail safe device arranged to move the first and second connector parts out of contact in the event of a loss in power.

29. The electrical connector of claim 28, wherein the fail safe device is a biasing device which is moveable between a first position when the first and second connector parts are in contact and a second position when the first and second connector parts are spaced apart, and wherein the biasing device is biased towards the second position.

30. The electrical connector of claim 1, wherein the actuator is a linear actuator and comprises a piston configured to extend and retract in the first direction.

31. The electrical connector of claim 1 wherein the first connector part is enclosed within an electromagnetic compatibility box when the first and second connector parts are not in contact.

32. The electrical connector of claim 31, wherein the first connector part is arranged to slide out of the electromagnetic compatibility box when the connector parts are in contact.

33. The electrical connector of claim 32, wherein the electromagnetic compatibility box comprises one or more outward opening doors biased into a closed position when the first connector part is inside the box, and wherein the doors are forced open by the first connector part when the first connector part slides out of the box.

34. The electrical connector of claim 1, wherein the first electrical connector part is configured to be mounted to the nacelle and the second electrical connector part is configured to be mounted to the hub of a wind turbine.

35. A wind turbine comprising:
a nacelle;
a rotor comprising one or more rotor blades extending radially outwards from a hub, the rotor being rotatably mounted to the nacelle; and
an electrical connector comprising:
   a first electrical connector part for connection to one of the nacelle or the hub;
   a second electrical connector part for connection to the other of the nacelle or the hub; and
   an actuator for moving the first or second electrical connector parts in a first direction between an extended position in which the first and second connector parts are in contact and form an electrical connection between the nacelle and the hub, and a retracted position in which the first and second electrical connector parts are spaced apart and do not form an electrical connection;
   wherein at least one of the first and second electrical connector parts include one or more magnets arranged to secure the first and second connector parts together when the parts are in contact.

36. The wind turbine of claim 35, wherein the first connector part of the electrical connector is mounted to the nacelle and the second connector part of the electrical connector is mounted to the hub.

37. The wind turbine of claim 36, wherein the first connector part is connected to a source of electrical power.

38. The wind turbine of claim 37, wherein the source of power is located inside the nacelle.

39. The wind turbine of claim 37, wherein the source of power is an auxiliary transformer.

40. The wind turbine of claim 35, further comprising one or more electrical components located inside at least one of the hub and the blade(s), wherein the electrical components are electrically connected to the electrical connector.

41. The wind turbine of claim 40, wherein the one or more electrical components located inside at least one of the hub and the blade(s) are components of a de-icing system.

* * * * *